S. L. ALLEN, DEC'D.
S. H., C. J., E. R. AND S. J. ALLEN AND E. A. ELFRETH, EXECUTORS.
SEED SOWING DEVICE.
APPLICATION FILED MAR. 29, 1916.
1,330,367.
Patented Feb. 10, 1920.
3 SHEETS—SHEET 1.
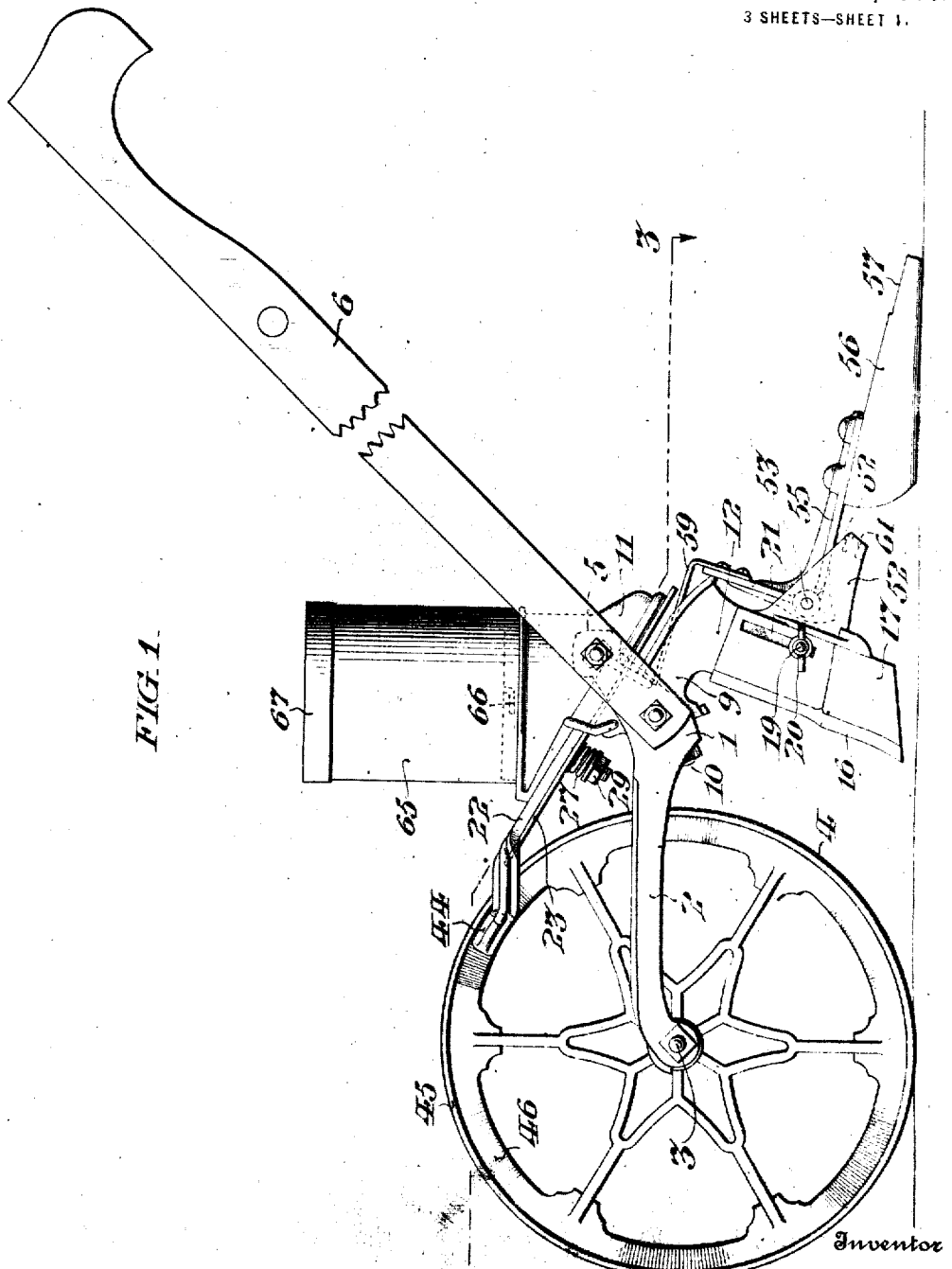

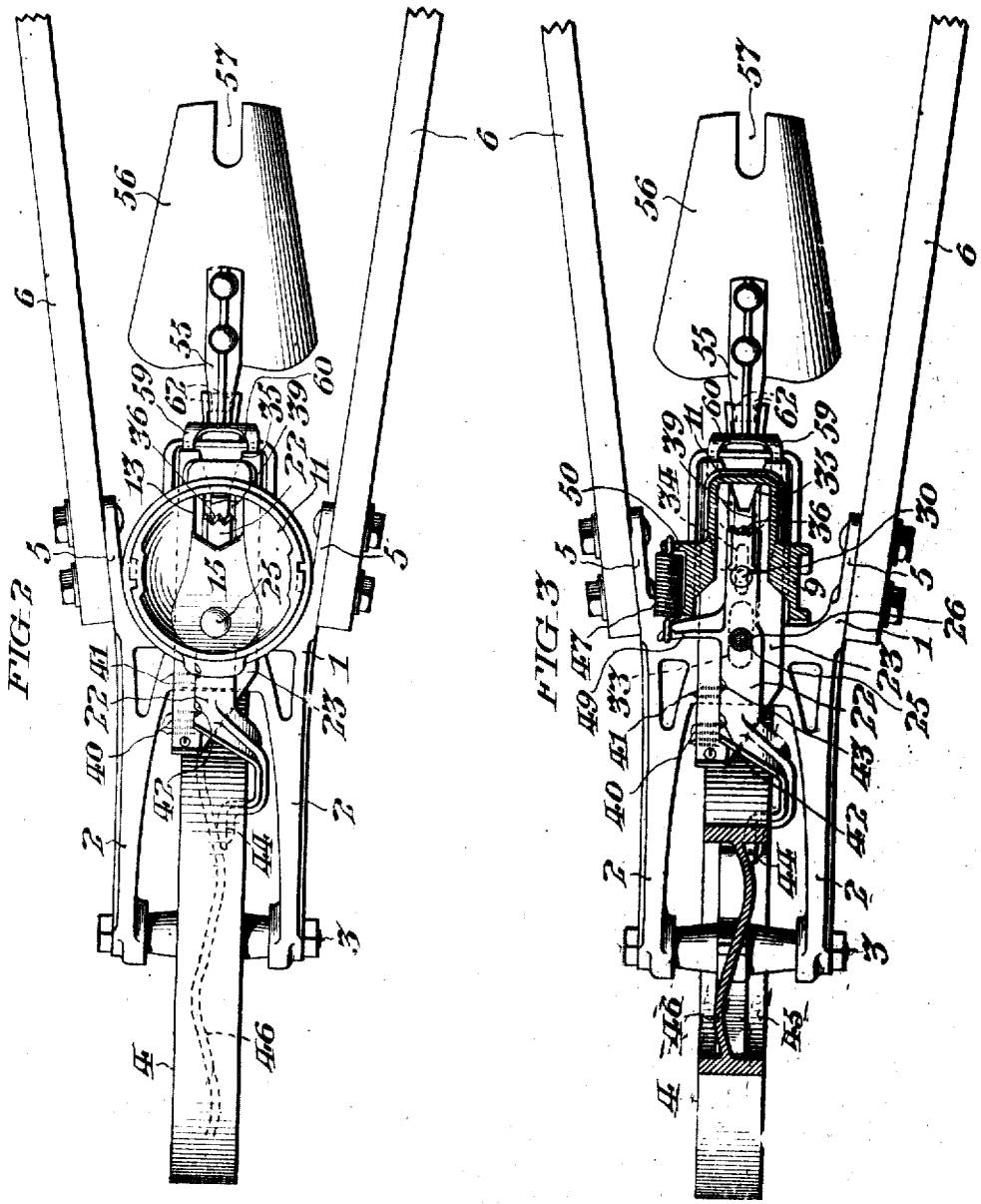

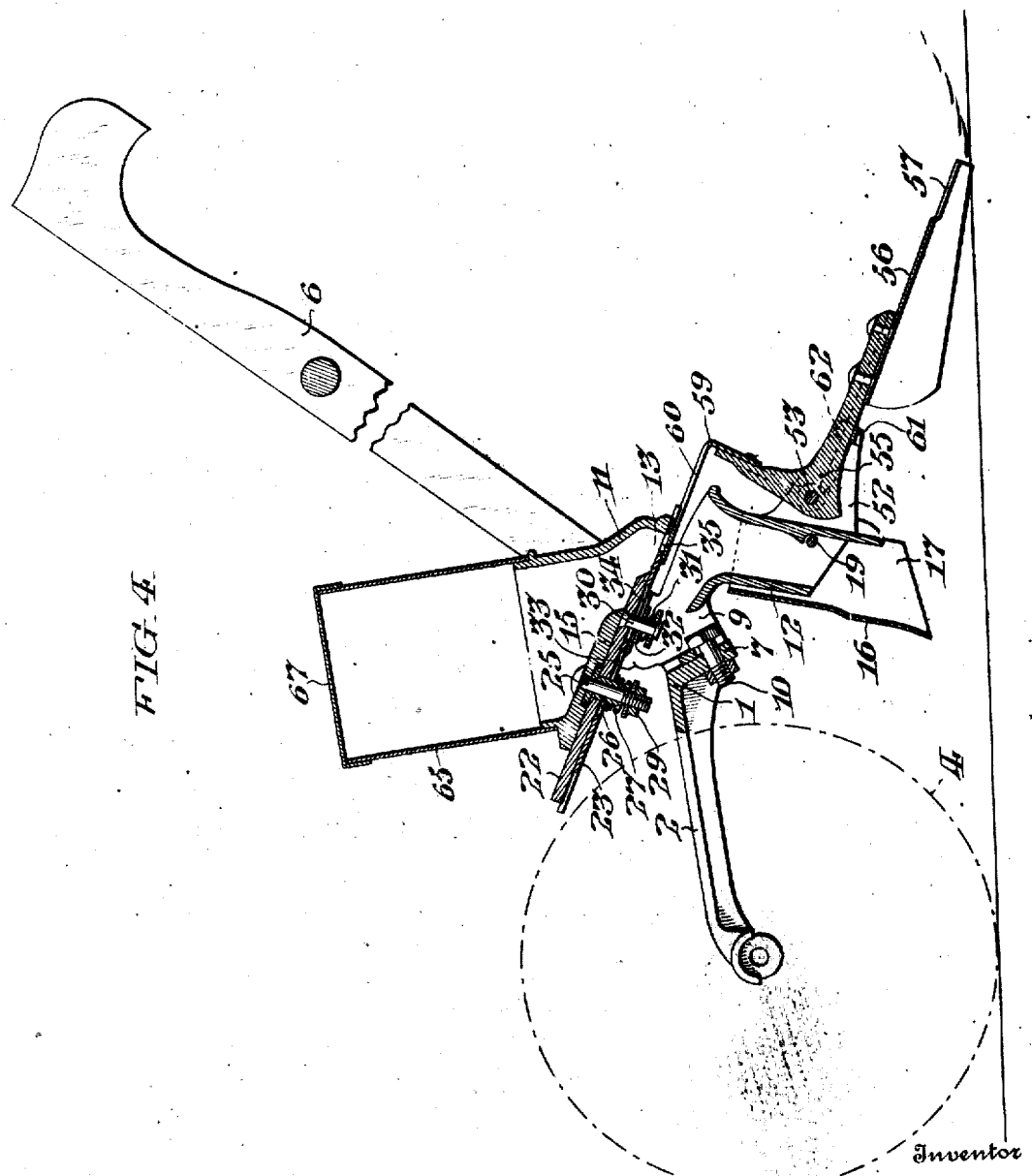

UNITED STATES PATENT OFFICE.

SAMUEL L. ALLEN, OF MOORESTOWN, NEW JERSEY; SARAH H. ALLEN, CHARLES J. ALLEN, ELIZABETH R. ALLEN, SUSAN J. ALLEN, AND EMILY ALLEN ELFRETH EXECUTORS OF SAID SAMUEL L. ALLEN, DECEASED.

SEED-SOWING DEVICE.

1,330,367.

Specification of Letters Patent.

Patented Feb. 10, 1920.

Application filed March 29, 1916. Serial No. 87,385.

*To all whom it may concern:*

Be it known that I, SAMUEL L. ALLEN, a citizen of the United States, residing at Moorestown, in the county of Burlington and State of New Jersey, have invented certain new and useful Improvements in Seed-Sowing Devices, whereof the following is a specification, reference being had to the accompanying drawings.

My invention relates particularly to that class of seed sowing devices that are automatically actuated by the rotation of the carrying wheel, and is directed especially to the mechanism for effecting the discharge of the seed.

The principal objects of my invention are to provide a seed sowing device which combines simplicity and durability with efficiency in the free and uniform distribution of seeds.

Other objects of my invention are to provide a seed sowing device which may be readily and conveniently adapted to sow different kinds and sizes of seeds, and to provide means actuated by the operating handles to close the outlet through which the seed are discharged.

My invention further comprehends a seed sowing device having means for agitating the seed in the container or hopper, and having a carrier wheel provided with an undulated surface arranged to effect the actuation of said agitating means.

Specifically stated the form of my invention as hereinafter described comprises a hopper having an discharge outlet, a wheel carrying said hopper and having a laterally undulated rim flange, a pivoted agitating plate having one end arranged to ride upon said undulated flange, and the other end bifurcated and arranged to oscillate across said outlet, a pivoted lever carrying a coverer blade, and having a plate arranged to close said outlet and hold said agitator inoperative.

My invention also includes all of the various novel features of construction and arrangement of the parts as hereinafter more definitely specified.

In the accompanying drawings, Figure 1 is a side elevational view of a seed sowing device constructed in accordance with my invention, showing the parts in position to discharge seed from the hopper; Fig. 2 is a plan view of the structure as shown in Fig. 1; Fig. 3 is a plan sectional view of the structure as shown in Figs. 1 and 2, taken on the line 3—3 in Fig. 1, and; Fig. 4 is a central vertical longitudinal sectional view of said device, showing the parts locked in position to close the discharge outlet of the hopper.

In said figures the frame 1 having the forwardly extending substantially parallel arms 2, through which the shaft 3 of the carrier wheel 4 extends, and having the rearwardly diverging arms 5 extending obliquely upward, to which the operating handles 6 are adjustably engaged, is provided with the rearwardly inclined oblique downwardly extending flange 7 to which the hopper casting 9 is adjustably secured by the bolt 10.

The hopper casting 9 comprises the hopper 11 and the inclined spout 12, the latter being disposed beneath the discharge outlet 13 in the inclined bottom wall 15 of said hopper, and carrying the drill plow 16, which is open at the back and has the substantially parallel sides 17 curvedly connected at the front and which embraces said spout, being secured thereto by the bolt 19 and winged nut 20, and as best shown in Fig. 1 having the slots 21 through which said bolt 19 extends so as to permit its longitudinal adjustment with respect to the ground plane.

As best shown in Figs. 1 and 4, the bottom wall 15 and the perimetral edges of the hopper which embrace the outlet 13 respectively form seats which incline rearwardly toward the ground plane, for the agitator blade 22 and the seed distributing plate 23, which is adjustably carried thereby.

Said blade 22 and plate 23 are pivotally carried by the bottom wall 15 upon the pintle comprising the bolt 25 and bushing 26 having a flange embedded in a suitable recess in said bottom wall as best shown in Fig. 4, said blade and plate being held under tension by the tension spring 27 surrounding said bushing and adjustably held in place by the nut 29.

The plate 23 is further engaged under tension with the blade 22 by the rivet 30, which carries the tension spring 31 tending to thrust the washer 32 against said plate 23 as clearly shown in Fig. 4. Said plate 23 is provided with slots 33 and 34 through which the bolt 25 and rivet 30 extend so as to be adjustable longitudinally to vary the size of the discharge outlet 13, whose effective area is governed by the opening 35 in the rear end of said plate, which is substantially V-shaped, as shown in Figs. 2 and 3.

In order to insure adequate agitation of the seed in the hopper to effect their proper and uniform discharge the rear end of the blade 22 is provided with serrations or teeth 36 and the upper surface of the plate 23 is provided with longitudinally extended grooves 39 as shown in Figs. 2 and 3.

The plate 23 is provided with an index to indicate its proper position to provide the outlet of suitable size for the discharge of different sizes, forms and kinds of seed to be sown, and comprises the names of the different seeds fixed at suitably disposed distances as shown at 40 and 41, and having corresponding graduations arranged to register with the notches 42 and 43 in the edge of the blade 22 as shown in Figs. 2 and 3.

It may be here noted that some seed of different kind may require substantially the same discharge outlet area and therefore in order to avoid confusion separate indexes are provided which register with different notches in the blade, and although, I have shown two groups of seed names 40 and 41 and two corresponding notches 42 and 43 any desired number may be employed.

As shown in Figs. 1, 2, and 3, the blade 22 is extended forwardly and bent laterally so as to freely pass the tread rim 45 of the wheel 4, and is provided with a curved faced shoe 44, slidably pressed into operative engagement with the laterally undulating rim flange 46 as best shown in Fig. 3, by the spring 47 connecting the arm 49 on the blade 22 and the bracket 50 on the hopper 11 and tending to draw the former toward the latter.

The spout 12 is provided with the hollow bracket 52 extended rearwardly between the side walls of which is pivoted on the pintal 53, the bell-crank-lever 55, carrying upon its rearwardly extending arm the coverer blade or tool 56, which is formed preferably of sheet metal, arched with depending sides, which converge slightly toward the rear, and said tool is provided with a central slot 57 extending forwardly from its rear edge and arranged to leave a trail of loose soil in the center of the ridge formed by converging depending sides, so that the sprouts from the seed may emerge without difficulty.

The upwardly extended arm of the bell-crank-lever 55 carries an L-shaped closure plate 59 arranged to close the discharge outlet 13 when the handles 6 are raised as shown in Fig. 4, as when the machine is at rest or being loaded, and said plate 59 is provided with the aperture 60 through which the seed may fall from the hopper to the spout when the handles are lowered and the machine is in its operative position as shown in Figs. 1, 2, and 3.

The bracket 52 has the transverse web 61 serving as a stop or rest for the bell-crank-lever 55, and is provided with opposed lugs 62 extending from the respective side walls and forming a lock for said bell-crank-lever when in the position shown in Fig. 4, the distance between said lugs being normally less than the width of the arm of said bell-crank-lever, but by reason of the yielding tendency of the bracket walls said lugs may be forced apart to pass said lever arm.

The hopper 11 may be provided with any convenient form of seed magazine such for instance as shown in Figs. 1 and 4 comprising the cylindrical shell 65, removably engaged with said hopper by the bayonet catch 66, and having the removable cover 67 to facilitate the convenient recharging of said magazine.

Although, I have elected to show the coverer of the particular form described, it is to be understood that other forms of tools, such for instance, as a rake, a hoe, a plow or what not, may be substituted therefor.

I do not desire to limit my invention to the precise details of construction and arrangement herein set forth, as it is obvious that various modifications may be made therein without departing from the essential features of my invention as defined in the appended claims.

Having thus described my invention, I claim:—

1. In a seed sowing device, the combination with a hopper having a discharge outlet, of a rearwardly declined agitator movable laterally across said outlet, a wheel having an irregular surface coöperative with said agitator to effect its movement, and a spring tending to engage said agitator with said surface.

2. In a seed sowing device, the combination with a wheel having a zig-zag surface, of a hopper having a discharge outlet, and a spring-pressed agitator movable laterally across said outlet in inclined relation thereto, and having an extension coöperatively engaged with said surface to effect its movement.

3. In a seed sowing device, the combination with a wheel having a rim flange provided with lateral undulations, of a hopper having a discharge outlet, a spring-pressed agitator pivoted to oscillate laterally across said outlet in rearwardly declined relation therewith, and having an extension coöperative with said flange to effect its oscillation.

4. In a seed sowing device, the combination with a wheel having an undulating runway, of a hopper having a discharge outlet, an agitator pivoted to oscillate across said outlet and having spring-pressed means coöperative with said run-way to effect its oscillation, and a plate carried by said agitator longitudinally adjustable to vary the effective area of said outlet.

5. In a seed sowing device, the combination with a wheel having an undulating runway, of a hopper having a discharge outlet, a spring-pressed agitator blade coöperative with said run-way to effect its movement across said outlet, and a plate provided with an opening having diverging edges, carried by said agitator and adjustable thereon to vary the effective area of said outlet.

6. In a seed sowing device, the combination with a wheel having an undulating run-way, of a hopper having a discharge outlet, a spring-pressed agitator blade coöperative with said run-way to effect its movement across said outlet, and a plate provided with an opening having diverging edges, carried by said agitator and adjustable thereon to vary the effective area of said outlet, and means releasable by pressure against the ground to close said outlet.

7. In a seed sowing device, the combination with a wheel having an undulating runway, of a hopper having a discharge outlet, a spring-pressed agitator blade coöperative with said run-way to effect its movement across said outlet, and a plate provided with an opening having diverging edges, carried by said agitator and adjustable thereon to vary the effective area of said outlet, means to close said outlet, and a lock to hold said means in closed position.

8. In a seed sowing device, the combination with a wheel, having an undulated surface, of a hopper having a discharge outlet, spring-pressed means coöperative with said surface to agitate the seed in said hopper, and means longitudinally adjustable to vary the effective area of said outlet.

9. In a seed sowing device, the combination with a wheel, having an undulated surface, of a hopper having a discharge outlet, spring-pressed means coöperative with said surface to agitate the seed in said hopper, and means adjustable to vary the effective area of said outlet, and means releasable by pressure against the ground to close said outlet.

10. In a seed sowing device, the combination with a wheel, having an undulated surface, of a hopper having a discharge outlet, means coöperative with said surface yieldingly held in contact therewith to agitate the seed in said hopper, and means adjustable to vary the effective area of said outlet, and means to close said outlet, and means releasable by pressure on the ground to lock said closing means in closed position.

11. In a seed sowing device, the combination with a wheel having an undulated surface, of a hopper having a discharge outlet, means coöperative with said surface yieldingly pressed in contact therewith to effect the movement of said means across said outlet and having serrations to effect the agitation of the seed in said hopper, and means to vary the effective area of said outlet.

12. In a seed sowing device, the combination with a wheel having an undulated surface, of a seed hopper provided with an inclined bottom having a discharge outlet, provided with a rearwardly declined seat, a plate bearing on said seat and having an opening movable across said outlet, and means coöperative with said surface and yieldingly pressed in contact therewith to move said plate.

13. In a seed sowing device, the combination with a wheel having an undulated surface, of a seed hopper provided with an inclined bottom having a discharge outlet provided with a rearwardly declined seat, a plate pivoted to said bottom and bearing on said seat, and having an opening movable across said outlet, and means yieldingly held coöperative with said surface to move said plate.

14. In a seed sowing device, the combination with a wheel having an undulated surface, of a seed hopper provided with a rearwardly declined bottom having a discharge outlet and a spout disposed beneath said outlet, a plate movably mounted on said seat and having an opening movable across said outlet, means yieldingly coöperative with said surface to effect the movement of said plate, and tension means tending to yieldingly hold said plate in engagement with said seat.

15. In a seed sowing device, the combination with a wheel having an undulated surface, of a seed hopper provided with an inclined bottom having a discharge outlet and a spout disposed beneath said outlet, a plate movably mounted on said seat and having an opening movable across said outlet, and means yieldingly coöperative with said surface to effect the movement of said plate in engagement with said seat.

16. In a seed sowing device, the combination with a wheel having an undulated surface, of a seed hopper provided with an inclined bottom having a discharge outlet provided with an inclined seat, and a spout disposed beneath said outlet, a plate movably mounted on said seat, and having an opening, movable across said outlet, means yieldingly coöperative with said surface to effect the movement of said plate in engagement with said seat, a plate pivotally mounted to close said outlet in one position and having an opening arranged to register with said outlet when in an alternative position.

In testimony whereof, I have hereunto set my hand in the presence of two subscribing witnesses.

SAMUEL L. ALLEN.

Witnesses:
PHILIP CLARKSON,
EDWARD A. NASH.